Feb. 5, 1924.
R. M. LOVEJOY
1,483,003
STEERING KNUCKLE CONSTRUCTION FOR VEHICLES
Filed Feb. 6, 1922
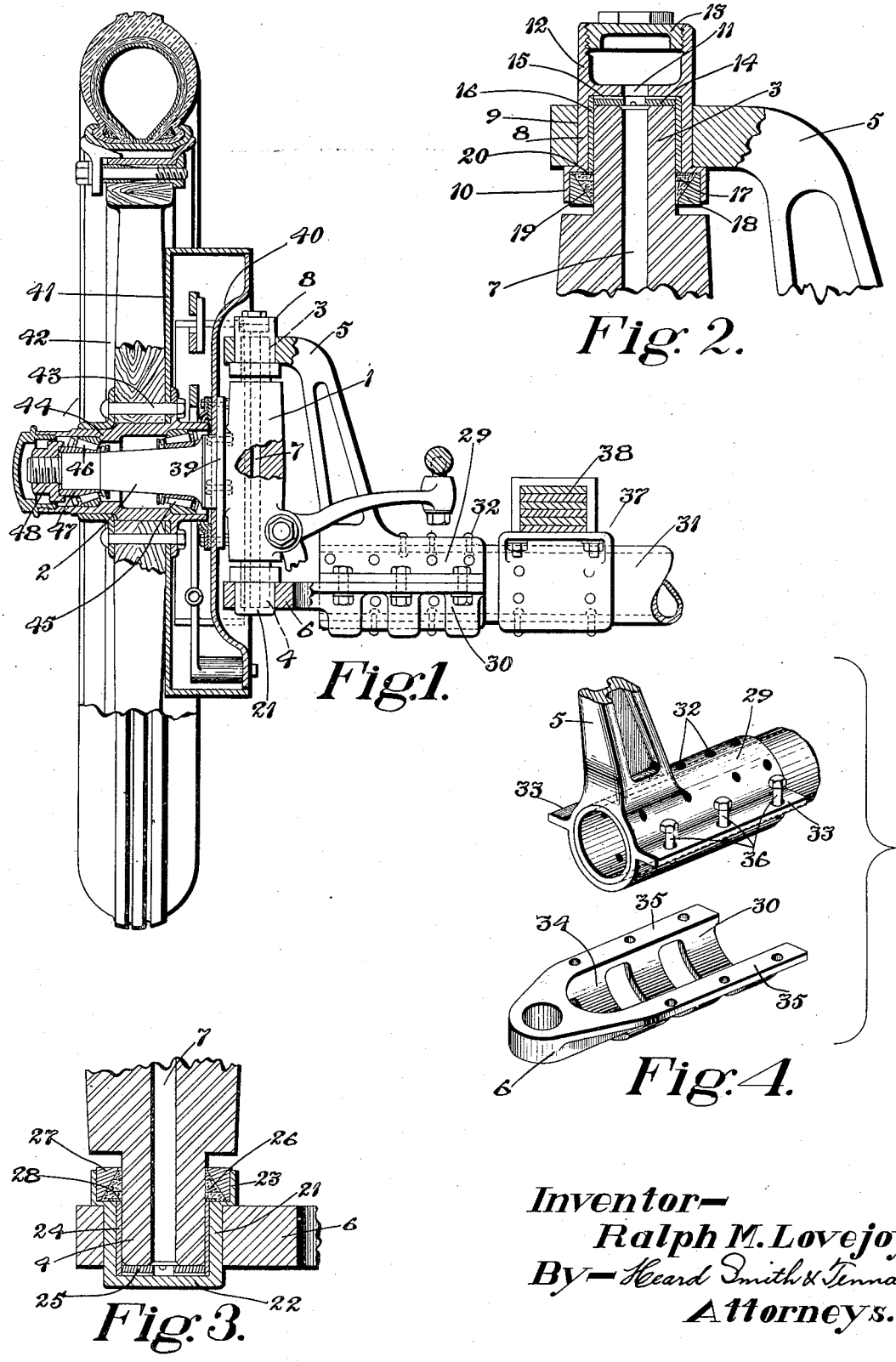
Inventor—
Ralph M. Lovejoy.
By— Heard Smith & Tennant.
Attorneys.

Patented Feb. 5, 1924.

1,483,003

UNITED STATES PATENT OFFICE.

RALPH M. LOVEJOY, OF MEREDITH, NEW HAMPSHIRE.

STEERING-KNUCKLE CONSTRUCTION FOR VEHICLES.

Application filed February 6, 1922. Serial No. 534,451.

*To all whom it may concern:*

Be it known that I, RALPH M. LOVEJOY, a citizen of the United States, and resident of Meredith, county of Belknap, State of New Hampshire, have invented an Improvement in Steering-Knuckle Constructions for Vehicles, of which the following description, in connection with the accompanying drawing, is a specification, like characters on the drawing representing like parts.

This invention relates to improvements in steering knuckle construction for vehicles, particularly for automobiles, and the principal object of the invention is to provide a novel steering knuckle and suitable means for connecting the same with the vehicle axle.

Another feature of the invention consists in providing a steering knuckle construction with means for supplying a lubricant thereto and means for preventing the escape of the lubricant from the bearings of the knuckle.

A further object of the invention is to provide a steering knuckle construction in which a steering knuckle is provided with, preferably, integral trunnions and is secured to the axle of the vehicle by separable yoke members which permit the assembling and dismantling of the steering knuckle.

A further object of the invention is to provide a steering knuckle of the character described with yoke members one of which is provided with a body portion adapted to embrace or enclose the end portion of the vehicle axle, the other member being secured by suitable means to the axle, or preferably to the first mentioned yoke member.

A further object of the invention is to provide a steering knuckle having integral therewith a wheel spindle and also means, preferably an annular flange, to which the disk of a brake mechanism may be secured. The latter construction is particularly designed for use in connection with a front wheel braking mechanism, such, for example, as is disclosed in my prior application Serial Number 475,912, filed June 8, 1921.

Other objects and features of the invention will more fully appear from the following description and the annexed drawings and will be pointed out in the claims.

In the drawings:

Fig. 1 is a view, partly in elevation and partly in section, of a steering knuckle construction as applied to the axle of a vehicle, the wheel which is assembled thereon being provided with a suitable brake mechanism;

Fig. 2 is an enlarged detail view showing in vertical section the end portion of the upper yoke member, the thimble socket for the trunnion of the steering knuckle and the trunnion seated therein;

Fig. 3 is an enlarged detail view in vertical section of the end portion of the lower yoke member and the trunnion socket journalled therein; and, Fig. 4 is a perspective view showing the portions of the yoke members which are secured to the axle in unassembled position.

In the preferred embodiment of the invention illustrated herein the steering knuckle comprises a post 1 having integral therewith a wheel spindle 2 and provided with trunnions 3 and 4 adapted to be seated respectively in suitable journals or sockets in the arms 5 and 6 of a yoke member which is connected to the vehicle axle. A lubricant conduit 7 extends, preferably axially, through the post and its trunnions. The trunnions may be journalled in suitable sockets in the arms 5 and 6 of the yoke members. Preferably, thimble sockets are provided which are so constructed as to prevent the escape of the lubricant from the journals in which the trunnions are mounted.

As illustrated particularly in Fig. 2, the upper trunnion socket comprises a cup-shaped thimble 8 which is forced tightly into a suitable aperture 9 in the end of the yoke arm 5 and is provided at its lower end with a flanged portion 10 forming an enlarged mouth to receive a packing for preventing the escape of the lubricant. The base portion of the thimble 8 is closed except for a central aperture 11 which communicates with the lubricant conduit 7. The upper portion of the thimble socket is provided with a tubular extension 12 providing a lubricant receptacle and the lubricant is retained therein by means of a cap 13 having a screw threaded periphery engaging complementary screw threads in the inner wall of the receptacle thus formed.

An anti-friction member, such as a hardened steel disk 14, is interposed between the base of the thimble socket and the end of the trunnion. The anti-friction disk 14 is provided with a central aperture communicating with the aperture 11 in the base of the thimble socket and with the conduit, and channels 15 in the upper portion of said anti-friction disk lead from said central aperture to the periphery of the socket, thus providing means for supplying lubricant directly to the wall of the socket.

Desirably, the thimble socket is provided with a cylindrical bushing 16 for the trunnion. In order to prevent the escape of the lubricant from the bearing thus formed the mouth of the thimble is provided with a suitable packing, preferably a plurality of disks 17, of cork, or other fibrous material, which are compressed by a retaining ring 18 having a beveled face 19 which engages the packing. The ring 18 desirably is provided with a knurled periphery and is forced into the mouth portion of the thimble socket under pressure, thus compressing the packing and forcing it readily toward the trunnion. A preferably metallic washer 20, which is seated upon the shoulder of the mouth portion, overlies the end of the bushing and prevents the packing from being squeezed between the bushing and the wall of the thimble. By reason of this construction the constant absorption of lubricant by the packing ring causes sufficient expansion to hold the packing tightly in contact with the bushing and prevent the escape of lubricant from the bearing.

The bearing for the lower trunnion 4 (see Fig. 3), is constructed in substantially the same manner as that above described and comprises a cup-shaped thimble socket 21 having a closed bottom 22 and a flanged upper end 23 providing a mouth to receive the packing. A bushing 24 is placed in the thimble socket to engage the trunnion and a thrust member or disk 25, having a central opening communicating with the conduit 7 and provided with preferably radial channels leading to the bushing, is interposed between the end of the thrust member and the base 22 of the thimble bushing. A fibrous packing 26, preferably of cork washers, is placed in the mouth of the thimble bushing and is compressed therein by a retaining ring 27, similar to the retaining ring 18, a washer 28 being interposed between the packing and the end of the bushing 24 to prevent the fibrous material from being forced between the bushing and the wall of the thimble socket. The ends of the trunnions desirably are rounded so that they may be inserted into the thimble sockets after the packing has been compressed therein as aforesaid without shearing the fibrous packing.

A further feature of the invention consists in providing separable yoke members which are adapted to be secured upon, and preferably to embrace, the vehicle axle. A tubular axle, preferably of cylindrical form, desirably is employed in order to obtain the greatest strength with a minimum amount of material. In the construction illustrated herein the yoke members 5 and 6 are provided respectively with base portions 29 and 30 which embrace the end portion of the tubular vehicle axle 31. The base 29 of the yoke member 5, in the preferred embodiment of the invention illustrated herein, is of cylindrical form and telescopically fits upon the end portion of the axle 31 and is secured thereto by rivets 32, or other suitable fastenings. This base member is provided with lateral flanges 33, preferably extending longitudinally thereof, in approximately the horizontal plane of the axis of the vehicle axle.

The base 30 of the other yoke member presents a concave face 34 adapted to fit the under cylindrical face of the base member 29 and is provided with flanges 35 adapted to be clamped against the flanges 33 by bolts 36, or other suitable fastenings. Preferably the body portion of the lower member is provided with recesses to avoid contact with the rivets which connect the under portion of the base of the upper yoke member to the vehicle axle. The usual chairs 37 for the vehicle spring 38 may be secured to the tubular axles by rivets, or other suitable fastenings.

By reason of the construction above described the steering knuckle construction can be conveniently made and assembled as the steering knuckle may be forged in one piece and the respective yoke arms may also be readily forged and the apertures to receive the thimble sockets drilled therein. The thimbles can be drop-forged and pressed into the apertures in the ends of the arms by a suitable mandrel actuated by hydraulic pressure or otherwise. The bushings, washers and packing may then be assembled in the thimble socket and the anti-friction member placed in the bottom of the socket. The upper trunnion may then be forced into its socket in the upper yoke arm and the base of said yoke arm telescopically fitted upon and secured to the axle. The socket of the lower yoke arm may then be applied to the lower trunnion and the base of said arm assembled upon the axle by the bolts 36 which pass through the flanges 33 and 35.

In case of necessity of breakage or the necessity of replacement, the yoke arms can be readily dismantled and others substituted therefor.

Another feature of the invention consists in providing the steering knuckle with means to which the disk of a braking mechanism, such as that disclosed in my prior application aforesaid, may be secured. As illustrated herein an annular flange 39 is formed integral with the steering knuckle post and wheel spindle 2 and extends from an enlarged base portion of the spindle. The brake disk 40 may be rigidly secured to this flange and the stationary portion of the braking mechanism mounted upon the disk 40 as disclosed in my prior application aforesaid.

A suitable brake drum 41 may be secured to the hub of a wheel 42 by bolts 43 preferably passing through the spokes of the wheel. The wheel hub 44 and the bearings interposed between the same and the spindle which are illustrated herein are of a novel construction comprising sets of roller bearings 45 and 46, the latter of which is retained in place by a conical retaining member 47 which is held in place by a nut 48 upon the end of the axle.

It will be understood that the embodiment of the invention disclosed herein is illustrative and not restrictive and that various changes in form, construction and arrangement of parts may be made within the spirit and scope of the following claims.

Having thus described my invention, what I claim as new, and desire to secure by Letters Patent, is:

1. A steering knuckle construction for vehicles comprising a steering knuckle having oppositely extending trunnions and a yoke formed in separable sections having sockets for the respective trunnions and complementary base portions surrounding the vehicle axle, means for detachably securing one of said base sections to the axle and means for securing said base sections together.

2. A steering knuckle construction for vehicles comprising a steering knuckle having oppositely extending trunnions and a yoke formed in separable sections having arms provided with sockets to receive the respective trunnions and with complementary base portions to fit and surround the vehicle axle, means rigidly securing one of the base sections to the yoke of the vehicle axle and means for detachably securing the other base section to the section which is secured to the axle.

3. A steering knuckle construction for vehicles comprising a steering knuckle having trunnions, an oil conduit extending through said knuckle and its trunnions, a yoke formed in separable sections embracing and secured to the vehicle axle and having cup-shaped sockets to receive said trunnions, means for supplying lubricant to the upper socket and to said conduit and anti-friction thrust members interposed between the ends of the trunnions and the bases of their respective sockets.

4. A steering knuckle construction for vehicles comprising a steering knuckle having trunnions, an oil conduit extending through said knuckle and its trunnions, a yoke formed in separable sections embracing and secured to the vehicle axle and having cup-shaped socket members to receive said trunnions, a reservoir integral with the upper socket member for supplying lubricant to the upper socket and to said conduit and anti-friction thrust members interposed between the ends of the trunnions and the bases of their respective socket members, said thrust members having central apertures communicating with said sockets and laterally extending channels leading to the walls of said sockets.

5. A steering knuckle construction for vehicles comprising a steering knuckle having trunnions, an oil conduit extending through said knuckle and trunnions, a yoke having separable base sections embracing and secured to the axle of the vehicle and having trunnion sockets comprising cup-shaped thimbles, each having an enlarged mouth portion, a packing in said mouth portion and a packing retainer forcibly secured in said mouth portion provided with a beveled face acting upon said packing to force the same toward the trunnion.

6. A steering knuckle construction for vehicles comprising a steering knuckle having trunnions, an oil conduit extending through said knuckle and trunnions, a yoke having separable base sections embracing and secured to the axle of the vehicle and having trunnion sockets comprising cup-shaped thimbles, each having an enlarged mouth portion, a rotatable bushing in said thimble, a washer in said mouth portion overlying the end of said bushing, a packing in said mouth portion and a packing retainer forcibly secured in said mouth portion provided with a beveled face acting upon said packing to force the same toward the trunnion.

7. A steering knuckle construction for vehicles comprising a steering knuckle having oppositely extending trunnions, a yoke formed of separable members each provided with an arm having a cup-shaped socket to receive a trunnion and one of said members having a cylindrical portion to surround the end portion of the vehicle axle and the other of said yoke members having a base formed to fit upon the cylindrical portion of the base member which surrounds the axle and means for detachably securing the base portions of said yoke members together.

8. A steering knuckle construction for vehicles comprising a steering knuckle having integral trunnions, a yoke having separable members provided with sockets to receive said trunnions, the upper of said yoke members having a tubular body portion adapted to receive the end of a vehicle axle and to be rigidly secured thereto, flanges extending laterally from said tubular portion, the lower yoke member comprising a body having a surface complementary to the under surface of the upper yoke member and provided with flanges and means for securing the flanges of the upper and lower yoke members together.

9. A steering knuckle construction for vehicles comprising a steering knuckle having oppositely extending trunnions and a separable yoke having its members adapted to embrace the vehicle axle and means for securing the same thereto, said yoke members being provided with arms having cup-shaped sockets to receive said trunnions and having enlarged mouth portions, means for supplying a lubricant to the bearings of said trunnions and means in the mouth portions of said sockets to prevent the escape of lubricant from said bearings.

10. A steering knuckle construction for vehicles comprising a steering knuckle having oppositely extending trunnions and a yoke formed in separable sections having its members embracing and secured to the vehicle axle and arms provided with sockets to receive said trunnions, rotatable bushings in said sockets, means for supplying a lubricant to the bearings for said trunnions and means for preventing the escape of lubricant from said bearings.

11. A steering knuckle construction for vehicles comprising a steering knuckle having oppositely extending integral trunnions provided with an oil conduit extending through said knuckle and trunnions and a yoke formed in sections having separable base members constructed to surround the end of the vehicle axle, means for securing said base members to said axle, the upper of said yoke members comprising an arm having a tightly fitted cup-shaped thimble socket provided with an upwardly extending flange to form a reservoir and having an aperture leading from said reservoir through the base of said socket to the trunnion conduit, the lower portion of said thimble socket being provided with an enlarged mouth, a fibrous packing in said mouth and a retaining ring pressed into said mouth having a beveled face engaging the fibrous material and acting to force the same toward the trunnion, the arm of the lower yoke section also having a thimble socket provided with an enlarged mouth containing a fibrous material and a retaining ring pressed into said mouth having a beveled face engaging the fibrous material and acting to force the same toward the trunnion.

In testimony whereof, I have signed my name to this specification.

RALPH M. LOVEJOY.